Patented Nov. 14, 1922.

1,435,350

UNITED STATES PATENT OFFICE.

GUSTAVE TÜSCHEL, OF ATLANTA, GEORGIA.

VARNISH.

No Drawing. Application filed December 9, 1919. Serial No. 343,487.

*To all whom it may concern:*

Be it known that I, GUSTAVE TÜSCHEL, a citizen of the United States, residing at Atlanta, in the county of Fulton and State of Georgia, have invented certain new and useful Improvements in Varnish, of which the following is a specification.

My said invention consists in a combination of ingredients for and the process of manufacture of a varnish or polish designed for automobile surfaces and kindred uses, said varnish being not only of a lustrous but a water-proof and weather-proof character, all as will be hereinafter more fully described and claimed.

Said varnish consists of the ingredients hereinafter specified in substantially the proportion and compounded in the following manner:

I take one and one-fourth pounds of india white gum i. e. elastic bleached white shellac to one gallon of water and boil the same together and then add one-fourth pound of caustic soda. After thorough dissolution of the gum and the mixing of the lye therewith the product is allowed to dry and is then pulverized and dissolved in three quarts of debased alcohol of 0.950 specific gravity to which has been added six grams D. C. shellac, three grams benzoin gum of Siam, five grams gum elemi, one-half pint artists' oil, clear, i. e. filtered petroleum, one-quarter pint oil of rose, and one-fourth pound free fatty vegetable acid, good quality. The same is filtered and to which is then added six grams of sandalwood extract.

This will make a clear transparent liquid impervious to water and capable of resisting the action of the sun and weather. It can be made any color desired by adding soluble coloring matter. It may be applied with a fine brush, cotton or cloth. Will dry quickly and with a brilliant gloss.

Having thus fully described my said invention, what I claim as new and desire to secure by Letters Patent, is:

1. A weather-proof coating or varnish consisting of india white gum, water, soda, alcohol, shellac, benzoin gum of Siam, gum elemi, filtered petroleum, oil of rose, free fatty vegetable acid, and sandalwood extract.

2. The process of preparing a varnish comprising boiling one and one-quarter pounds of india white gum in one gallon of water adding one and one-quarter pounds of caustic soda, then drying, pulverizing and dissolving the same in three quarts of alcohol, and including shellac, benzoin gum of Siam, gum elemi, filtered petroleum, oil of rose, free fatty vegetable acid and sandalwood extract, substantially in the proportions set forth.

3. The method of preparing a varnish which consists in boiling india white gum in the proportion of one-quarter pound of india white gum in one gallon of water, adding thereto one-quarter pound of caustic soda, allowing the same to dry, then pulverizing, then dissolving in three quarts of alcohol to which has been added six grams of D. C. shellac, three grams of benzoin gum of Siam, five grams of gum elemi, one-half pint of filtered petroleum, one-quarter pint of oil of rose, and one-quarter pint of free fatty vegetable acid and filtering, then adding six grams of sandalwood extract.

In witness whereof, I have hereunto set my hand and seal at Atlanta, Georgia, this third day of December, A. D. nineteen hundred and nineteen.

GUSTAVE TÜSCHEL. [L. S.]

Witness:
GEO. W. GORMAN.